Feb. 9, 1960 D. R. JONES 2,924,705

POCKET TYPE RADIO RECEIVER CONSTRUCTION

Filed April 30, 1956 2 Sheets-Sheet 1

INVENTOR.
Donald R. Jones,
BY Mueller & Aichele
Att'ys.

INVENTOR.
Donald R. Jones,
BY Mueller & Aichele
Atty's.

United States Patent Office 2,924,705
Patented Feb. 9, 1960

2,924,705

POCKET TYPE RADIO RECEIVER CONSTRUCTION

Donald R. Jones, Westchester, Ill., assignor to Motorola, Inc., Chicago, Ill., a corporation of Illinois Application April 30, 1956, Serial No. 581,525
2 Claims. (Cl. 250—14)

Figures 1, 2, 3, 4:
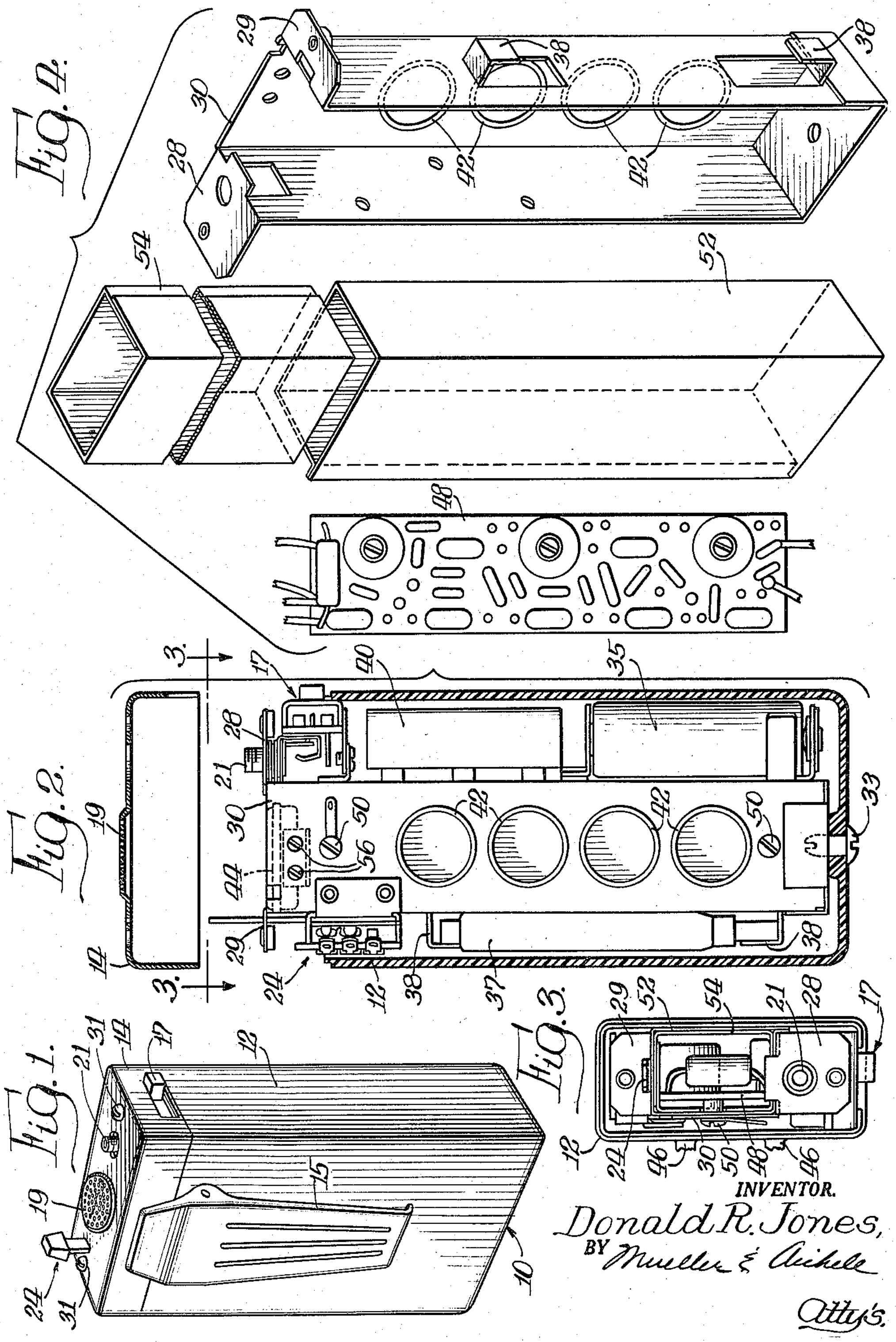

This invention relates to signal receivers and more particularly to receivers of the so-called pocket type which are useful for example, in paging apparatus.

Various types of radio systems have been proposed for the purpose of paging or communicating with persons at remote points. One such system is described and claimed in copending application Serial No. 529,838, filed August 22, 1955, in the name of Robert P. Crow and Russell R. Yost, Jr., and assigned to the assignee of the present invention. This communication system contemplates selective one-way paging by employing miniature low frequency, frequency modulation receivers. A transmitter is used which sets up in a given area an induction field, or carrier, in the 50–200 kilocycle region, which is initially frequency modulated by one or more of a plurality of calling signals of different low audio frequencies and secondly is frequency modulated by a voice signal from an operator relaying a message. Persons to be paged each carry a miniature receiver which is continuously responsive to the carrier, but is responsive to modulation of the carrier to produce an audible buzz only when the modulation is at one particular frequency. Thus the persons subject to paging may be selectively notified that a message will follow. To hear the message following reception of the calling signal, the user of the receiver may operate a switch to apply the demodulated signal to a loudspeaker or ear piece.

In a system as outlined above, it is generally desirable to construct the receiver so that it is of small size and low weight, but yet sturdy, in order to facilitate carrying thereof by the user. It is also advantageous to have the controls readily accessible and to have provision for expedient replacement of the battery or performance of other service operations.

In most cases, the transmitted power in paging systems is kept at a low level so that the complete system is comparatively inexpensive and so that any applicable government power restrictions are not exceeded. Accordingly, it may be seen that the receiver must provide high gain to utilize signals of this type in areas where the relatively low power signal may be attenuated by surrounding objects. Both size and gain requirements may be difficult to realize in practice because close spacing of high gain circuit components often results in troublesome intercoupling among the stages.

It is an object of this invention to provide a compact signal receiver with conveniently grouped controls and rugged mechanical construction to withstand the abuse encountered by a portable pocket receiver.

Another object of the invention is to provide a high gain radio receiver of small size which successfully overcomes problems of intercoupling among the various stages thereof.

A feature of the invention is the provision of an improved pocket radio receiver having a speaker disposed in the one open end of a five sided high quality shield case for the receiver and a frame for supporting the shield case and receiver chassis to form a rugged compact apparatus.

Another feature of the invention is the provision of such an improved pocket receiver wherein a high gain receiver circuit is disposed within the shield case, an antenna is supported on the outside of the frame, and a pair of frame flanges adjacent to the loud speaker provide panel like portions for the controls of the device.

Figure 5:
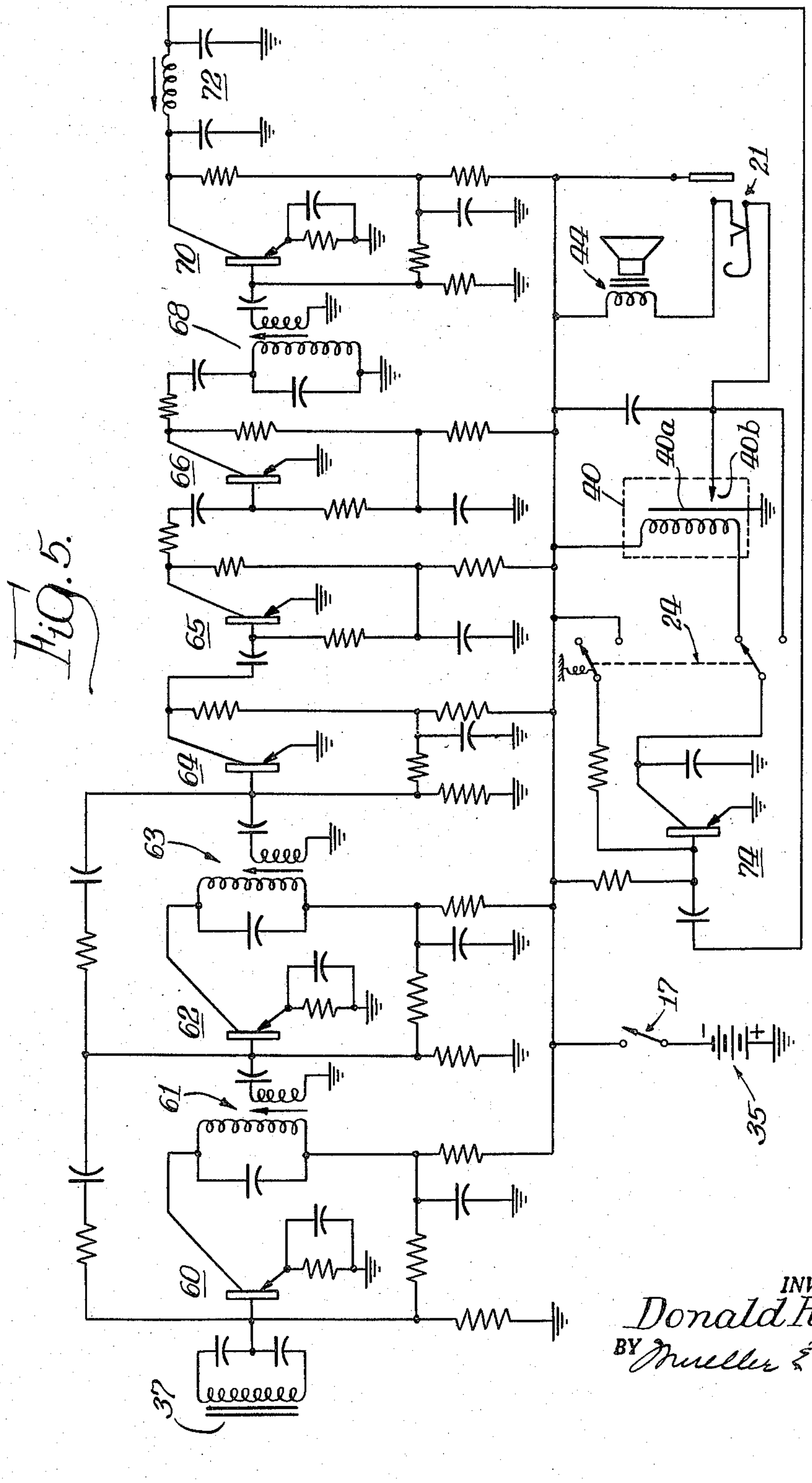

Further objects, features and the attending advantages thereof will be apparent upon consideration of the following description when taken in conjunction with the accompanying drawings in which:

Fig. 1 is a perspective view of the assembled receiver of the present invention, Fig. 2 is a view of the assembled receiver with the housing therefor exploded and sectioned, Fig. 3 is a top view of the receiver chassis taken along the line 3—3 of Fig. 2, Fig. 4 is an exploded view of the chassis, shield and frame of the receiver, and Fig. 5 is a schematic diagram of the circuit of the receiver.

The invention provides a self contained pocket receiver for a paging system. The receiver circuit includes a plurality of radio frequency amplifiers coupled to a frequency modulation detector which is connected to an audio frequency amplifier. The output of the receiver is normally applied through a frequency selective reed device to a loudspeaker so that a user of the receiver may be paged when his receiver picks up a signal which is modulated by a tone to which the reed responds. After receiving such an "alert" the user may operate a switch to apply the output of the receiver directly to the speaker for listening to a voice message.

In order to construct the receiver in compact form and without external connections to batteries, an antenna, or the like, and at the same time to successfully isolate the high gain stages, the receiver is built upon a plated or printed circuit panel which is encased in a highly efficient shield having only one open end. The shield case is supported in a channel frame member providing mechanical strength for the apparatus and having flanges adjacent the open end of the shield behind which are disposed controls necessary to operate the receiver. A battery is secured on one side of the frame member and an antenna is secured to another side thereof. The speaker supported in the open end of the shield completes the isolation of the high gain radio frequency circuits from the effects of body capacity, antenna feedback, and the like. The compact form thus provided is attached by means of the flanges of the frame to one portion of a two piece housing which completely encloses the apparatus and may be clipped to the pocket of a user.

Fig. 1 shows a perspective view of the pocket radio receiver 10 as encased in a two piece housing having a plastic bottom 12 and a metal top 14, with the controls available from the top. The receiver may be clipped into a pocket of the user by means of the spring biased clip 15. A slide type switch 17 is provided to turn the receiver on and off and a grill 19 is provided in the top to pass sound from a loudspeaker. Provision is also made for using an earphone when it is undesirable to use a loudspeaker, and the earphone may be connected to the receiver by means of jack 21. Switch 24 may be operated by the user after receiving a calling signal in order to connect the loudspeaker directly to the receiver output to reproduce a voice message contained as modulation of a received signal.

Fig. 2 shows the housing 12, 14 in section, with the top 14 removed from the apparatus. Top 14 is secured to flanges 28, 29 of frame 30 by means of suitable screws 31 (Fig. 1). The entire apparatus may be removed from the housing bottom 12 by turning single fastener 33 and releasing the apparatus should this be necessary to replace battery 35 or for some other reason. It may be noted that it is unnecessary to unfasten housing top 14 at such time. The top and bottom ordinarily are closed in mated relation to encase the receiver as shown in Fig. 1.

Antenna 37 is secured to one side of frame 30 by means of clips 38 which are a part of the frame. Along the other side of frame 30, in addition to battery 35 is a frequency responsive reed device 40 which, as previously explained, permits selective paging of individuals among a plurality of users with similar receivers. Fig. 2 further shows that jack 21 and switch 17 are also supported beneath flange 28 which forms a panel therefor and that switch 24 is supported beneath flange 29. It may be seen that the back side of frame 30 includes a series of apertures 42 which have deformed peripheries in order to strengthen the frame and make it lighter.

Fig. 3 shows an end view of the apparatus with cover 14 and loudspeaker 44 (Fig. 2) removed. In this view projections 46 are visible and these provide pivot points for the clip 15. Printed circuit chassis 48 is also shown as it is supported from the frame 30 by means of screws 50 and accompanying spacers within a shield 52 which is lined with fiber insulating material 54.

Fig. 4 illustrates the chassis 48, the shield 52, lining 54, and frame 30 all separated from one another. In this view it may be noted that chassis 48 is used for supporting all of the various circuit components with the exception of those specifically mentioned in connection with Fig. 2. The particular circuitry of the receiver will be described in connection with the diagram of Fig. 5. However, it should be pointed out that of Fig. 4 shows frame 30 in the shape of a channel having an open end and an enclosed bottom. This frame is preferably formed of aluminum or some other lightweight material. Furthermore, shield 52 is shown having a rectangular shape, four enclosed sides, an enclosed bottom, and only one end thereof open. This shield is preferably formed of a lightweight, high grade shielding material such as Mumetal. The liner 54 may be constructed of a fiber material to completely insulate the interior of shield 52 and prevent short-circuiting of any wiring of panel 48. In the assembled form of the receiver, speaker 44 (Fig. 2) is supported by means of screws 56 on frame 30 and this encloses the open end portion of shield 52.

In Fig. 5 there is shown a transistorized, high gain tuned radio frequency, frequency modulation receiver. In this receiver, antenna 37 is coupled to a first radio frequency amplifier 60 which is coupled to a second radio frequency amplifier 62 by means of tuned transformer 61. The output of amplifier 62 is further coupled to radio frequency amplifier stage 64 by means of tuned transformer 63. The receiver further includes radio frequency amplifier stages 65 and 66, which are resistance capacity coupled to one another. Amplifiers 64—66 are constructed to provide limiting of the received frequency modulation (FM) signal, and therefore these stages will have low selectivity so that they are not intercoupled by means of tuned circuits as are the first and second amplifiers 60, 62. The output of amplifier 66 is applied through transformer 68 to the detector stage 70. Transformer 68 is detuned slightly from the carrier frequency of the received signal so that detector stage 70 operates as a so-called "slope detector."

The audio signal from stage 70 is coupled by way of radio frequency filter 72 to an audio amplifier stage 74. The output of amplifier 74 is normally applied through the contacts of switch 24 to the coil of frequency selective reed device 40. Switch 24 is spring-biased in this position so that unless operated, whenever the received signal is modulated by a tone to which device 40 is responsive, the vibrating reed 40*a* will be set in motion to make intermittent contact with contact 40*b* and apply the potential from battery 35 through on-off switch 17 and closed circuit phone jack 21 to loudspeaker 44. Accordingly, when a user of the receiver is being paged, he will hear a given tone from the loudspeaker and will know at that time to operate switch 24 and apply the output from amplifier stage 74 through the phone jack 21 directly to the loudspeaker 44. An operator of the transmitting station would, of course, after signalling a person being paged, then transmit the desired voice message to be relayed. Phone jack 21 is of standard construction and merely opens the circuit to speaker 44 and completes it to an earphone when a plug thereof is inserted in this jack.

As set forth more fully in the co-pending application previously mentioned, a paging system with which this receiver can be used has been operated very successfully using carrier frequency between 50 kilocycles and 200 kilocycles. The audio tones used for selective calling may be in the range of 100–1100 cycles per second.

In many paging applications it has been found necessary to use low amplitude transmitting signals in order to comply with FCC regulations, while on the other hand, it has also been found that many areas in which such a system may be used contain objects which tend to attenuate the transmitted signal. Therefore, the receiver circuit is of the high gain type and as is obvious, includes five radio frequency amplifier stages. Furthermore, since it is desirable that the receiver be small and of pocket size, these stages are all constructed in compact form and using transistors. It is also advantageous to have the receiver be entirely self-contained, that is, with the antenna and batteries all within the receiver case, so that no external wires are necessary. In the construction of receivers of this type, there are ordinarily many difficulties encountered in preventing feedback or oscillation among the various radio frequency stages, and this is particularly so when the antenna is in close proximity to these stages. However, by using the physical arrangement of components and the frame and shielding construction previously described herein, it has been found possible to obtain high quality performance from this receiver without objectionable feedback and/or body capacity effects. Furthermore, the receiver has conveniently grouped controls and a rugged mechanical construction so that it may withstand the abuse to which it may be subjected in the pocket of the user.

What is claimed is:

1. A pocket type radio receiver including in combination, a printed circuit panel having receiver circuit components mounted thereon including a plurality of radio frequency amplifier stages, a radio frequency shield surrounding said panel and the components thereon, an elongated housing for the receiver including first and second housing portions for enclosing the receiver to form a completely self-contained unit, frame means at least partially surrounding said shield for supporting the same and the printed circuit panel, a clip secured to said housing for fastening said receiver to the apparel of a user with one end of said first housing portion facing upwardly, a loudspeaker disposed adjacent said first housing portion, said first housing portion having an opening therein in said one end thereof to pass sound from said loudspeaker, control means for said receiver having operating means therefor projecting outwardly through said first housing portion to be manually operable externally of said receiver, a battery supported by said frame means, antenna means supported by said frame means externally of said shield and being the sole component operative at radio frequencies disposed externally of said shield, and means for releasably securing said first and second housing portions and said frame means to permit access to said receiver and components supported within said housing.

2. A pocket type radio receiver including in combination, a printed circuit panel having receiver circuit components mounted thereon including a plurality of high gain radio frequency amplifier stages operative at the same frequency, a radio frequency shield disposed about said panel and the components thereon, said shield having an open end portion, an insulated lining within said shield, an elongated housing for the receiver including first and second housing portions for enclosing the receiver to form a completely self-contained unit, frame means at least partially surrounding said shield for supporting the same and the printed circuit panel, a clip secured to said housing for fastening said receiver to the apparel of a user with one end of said first housing portion facing upwardly, a loudspeaker disposed at the open end portion of said shield and adjacent said first housing portion, said first portion having an opening therein in said one end thereof to pass sound from said loudspeaker, control means for said receiver having operating means therefor projecting outwardly through said first housing portion to be manually operable with said receiver supported by said clip, a battery supported by and disposed along said frame means, antenna means supported by and disposed along said frame means externally of said shield for minimizing feedback between said antenna and said amplifier stages, and means for releasably securing said first and second housing portion and said frame means to permit access to said receiver and components supported within said housing.

References Cited in the file of this patent

UNITED STATES PATENTS

| | | |
|---|---|---|
| 2,296,678 | Linder | Sept. 22, 1942 |
| 2,398,406 | Brown et al. | Apr. 16, 1946 |
| 2,439,411 | Mitchell | Apr. 13, 1948 |
| 2,508,918 | Hines | May 23, 1950 |
| 2,515,333 | Buffington | July 18, 1950 |
| 2,521,423 | Stuck | Sept. 5, 1950 |
| 2,560,320 | Winkler | July 10, 1951 |
| 2,630,526 | Zelov | Mar. 3, 1953 |
| 2,647,957 | Mallinckrodt | Aug. 4, 1953 |
| 2,810,068 | Weisz et al. | Oct. 15, 1957 |